(12) United States Patent
Narayanan et al.

(10) Patent No.: US 10,146,837 B1
(45) Date of Patent: Dec. 4, 2018

(54) RLE-AWARE OPTIMIZATION OF SQL QUERIES

(71) Applicant: Pivotal Software, Inc., San Francisco, CA (US)

(72) Inventors: Sivaramakrishnan Narayanan, Sunnyvale, CA (US); Florian Michael Waas, Sunnyvale, CA (US)

(73) Assignee: Pivotal Software, Inc., San Francisco, CA (US)

( * ) Notice: Subject to any disclaimer, the term of this patent is extended or adjusted under 35 U.S.C. 154(b) by 38 days.

(21) Appl. No.: 15/595,506

(22) Filed: May 15, 2017

Related U.S. Application Data

(63) Continuation of application No. 15/250,316, filed on Aug. 29, 2016, now Pat. No. 9,652,501, which is a continuation of application No. 14/923,228, filed on Oct. 26, 2015, now Pat. No. 9,430,524, which is a continuation of application No. 13/248,536, filed on Sep. 29, 2011, now Pat. No. 9,171,041.

(51) Int. Cl.
*G06F 17/30* (2006.01)

(52) U.S. Cl.
CPC .. *G06F 17/30501* (2013.01); *G06F 17/30442* (2013.01); *G06F 17/30463* (2013.01); *G06F 17/30466* (2013.01); *G06F 17/30498* (2013.01); *G06F 17/30569* (2013.01)

(58) Field of Classification Search
CPC ......... G06F 17/30442; G06F 17/30498; G06F 17/30463; G06F 17/30433; G06F 17/30474; G06F 17/30454; G06F 17/3046; G06F 17/30501; G06F 17/30466
See application file for complete search history.

(56) References Cited

U.S. PATENT DOCUMENTS

| | | | |
|---|---|---|---|
| 6,760,724 B1 | 7/2004 | Chakrabarti et al. | |
| 7,167,853 B2 | 1/2007 | Zaharioudakis et al. | |
| 7,773,815 B2 | 8/2010 | Shen et al. | |
| 8,126,870 B2 | 2/2012 | Chowduri et al. | |
| 8,171,031 B2 | 5/2012 | Tankovich et al. | |
| 8,356,027 B2 | 1/2013 | Jaecksch et al. | |
| 8,671,091 B2 * | 3/2014 | Cherniack | G06F 17/30457 707/606 |

(Continued)

*Primary Examiner* — Leslie Wong
(74) *Attorney, Agent, or Firm* — Fish & Richardson P.C.

(57) ABSTRACT

SQL queries are optimized to operate directly on compressed data (and obtain the correct result) rather than requiring that the data be first decompressed prior to processing a query. Certain characteristic pattern trees are mapped against a logical input query plan that includes certain logical operators such as a DECOMPRESS that precedes a JOIN or a GROUPBY in association with a COUNT to identify instances in the plan that match a characteristic pattern. Upon locating a match, the input query plan is transformed into a logically equivalent plan that operates correctly on compressed data, by analyzing the interplay of the semantics of logical query operations with the compressed data and substituting less costly structures and operations. DECOMPRESS operations are moved to operate subsequent to a JOIN or eliminated altogether, and COUNT operations are replaced by a different operation, such as SUM, that is logically equivalent for compressed data.

20 Claims, 9 Drawing Sheets

(56) References Cited

U.S. PATENT DOCUMENTS

| | | | |
|---|---|---|---|
| 8,688,683 B2* | 4/2014 | Simon | G06F 17/30463 |
| | | | 707/713 |
| 9,171,041 B1* | 10/2015 | Narayanan | G06F 17/30463 |
| 9,430,524 B1* | 8/2016 | Narayanan | G06F 17/30463 |
| 9,652,501 B1* | 5/2017 | Narayanan | G06F 17/30463 |
| 2004/0034616 A1 | 2/2004 | Witkowski et al. | |
| 2005/0192943 A1 | 9/2005 | Siddiqui et al. | |
| 2008/0071818 A1 | 3/2008 | Apanowicz et al. | |
| 2009/0006399 A1* | 1/2009 | Raman | G06F 17/30498 |
| 2010/0088309 A1* | 4/2010 | Petculescu | G06F 17/3048 |
| | | | 707/714 |
| 2010/0088315 A1* | 4/2010 | Netz | G06F 17/30501 |
| | | | 707/737 |
| 2001/0131199 | 6/2011 | Simon et al. | |
| 2011/0208703 A1* | 8/2011 | Fisher | G06F 17/3092 |
| | | | 707/692 |
| 2011/0302226 A1* | 12/2011 | Abadi | G06F 17/3038 |
| | | | 707/825 |
| 2011/0307471 A1 | 12/2011 | Sheinin | |
| 2011/0307521 A1 | 12/2011 | Slezak et al. | |
| 2012/0054225 A1 | 3/2012 | Marwah et al. | |
| 2012/0054236 A1 | 3/2012 | Branscome et al. | |
| 2012/0173517 A1 | 7/2012 | Lang et al. | |
| 2015/0088857 A1* | 3/2015 | Lee | G06F 17/30469 |
| | | | 707/718 |

* cited by examiner

RLE-AWARE OPTIMIZATION OF SQL QUERIES

CROSS-REFERENCE TO RELATED APPLICATIONS

This application is a continuation of and claims priority to U.S. application Ser. No. 15/250,316, filed on Aug. 29, 2016 (now U.S. Pat. No. 9,652,501), which is a continuation of U.S. application Ser. No. 14/923,228, filed on Oct. 26, 2015 (now U.S. Pat. No. 9,430,524), which is a continuation of U.S. application Ser. No. 13/248,536, filed on Sep. 29, 2011 (now U.S. Pat. No. 9,171,041). The entire disclosures of each of the prior applications are considered part of and are incorporated by reference in the disclosure of this application.

BACKGROUND

This invention relates generally to database query optimization, and more generally to optimization of queries for databases having compressed data.

In order to conserve resources and processing time, many databases are compressed at the storage level using, for example, run-length encoding (RLE) compression or other compression techniques. Compression conserves storage space and reduces the number of read requests. However, queries conventionally decompress compressed stored data and operate on uncompressed data. Thus, in order to execute a query on compressed databases, the data must be first decompressed and the query executed multiple times on decompressed data that may be the same. The multiple intermediate results must then be aggregated to obtain an answer. This is inefficient, and results in substantial and costly processing and long overall response times.

It is desirable to provide systems and methods that address these and other known problems of executing queries on compressed data by minimizing computation costs and reducing query response time, and it is to these ends that the invention is directed.

DESCRIPTION OF PREFERRED EMBODIMENTS

The invention is particularly well adapted for use with distributed database systems which compresses data at the storage level using RLE-based compression and structured query language (SQL) queries, and will be described in that environment. It will become apparent, however, that this is illustrative of only one utility of the invention and that the invention may be employed with other databases, with other types of compression, and with other query languages.

Figure 1:
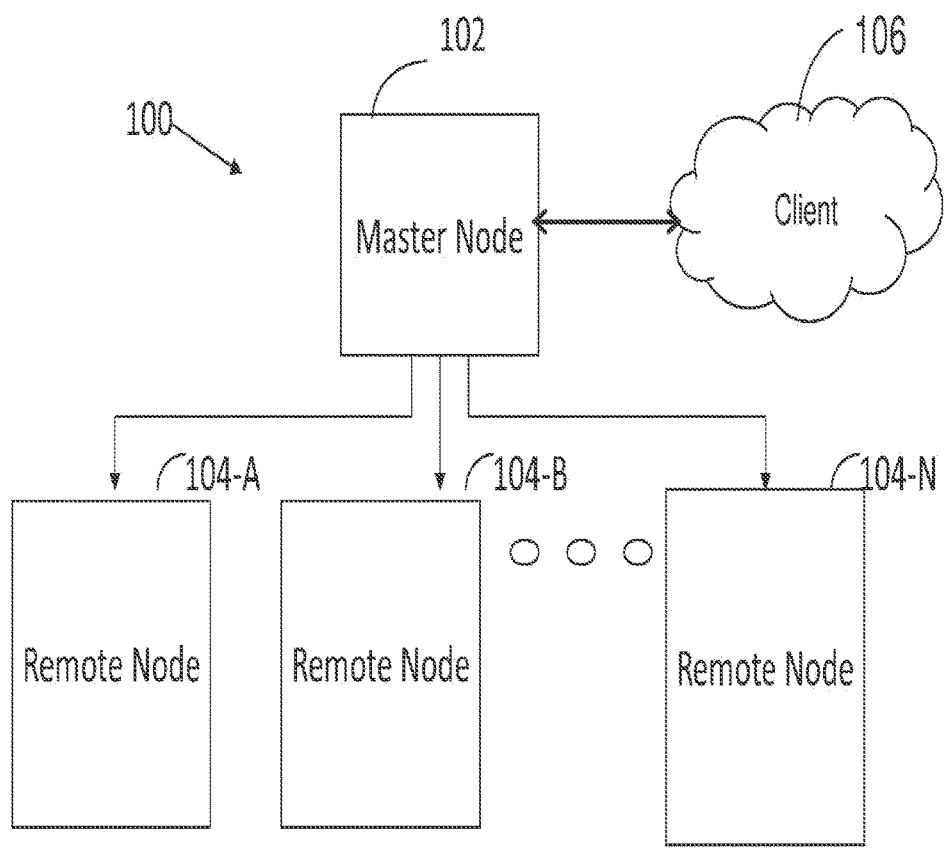
FIG. 1 illustrates a conventional shared nothing architecture for a distributed database of the type in which the invention may be employed.

FIG. 1 illustrates a shared-nothing network architecture of a logical database 100 of the type with which the invention may be employed. The network may include a master node 102 which connects to and manages a plurality of shared-nothing nodes 104-A through 104-N. Each node may comprise a plurality of database segments (database instances) including one or more primary databases and one or more mirror databases. Data may be stored in the segments in compressed form using run length encoding (RLE) compression, for example, and accessed using queries such as SQL queries. Clients 106 may interact with the database through the master node 102.

Figure 2:
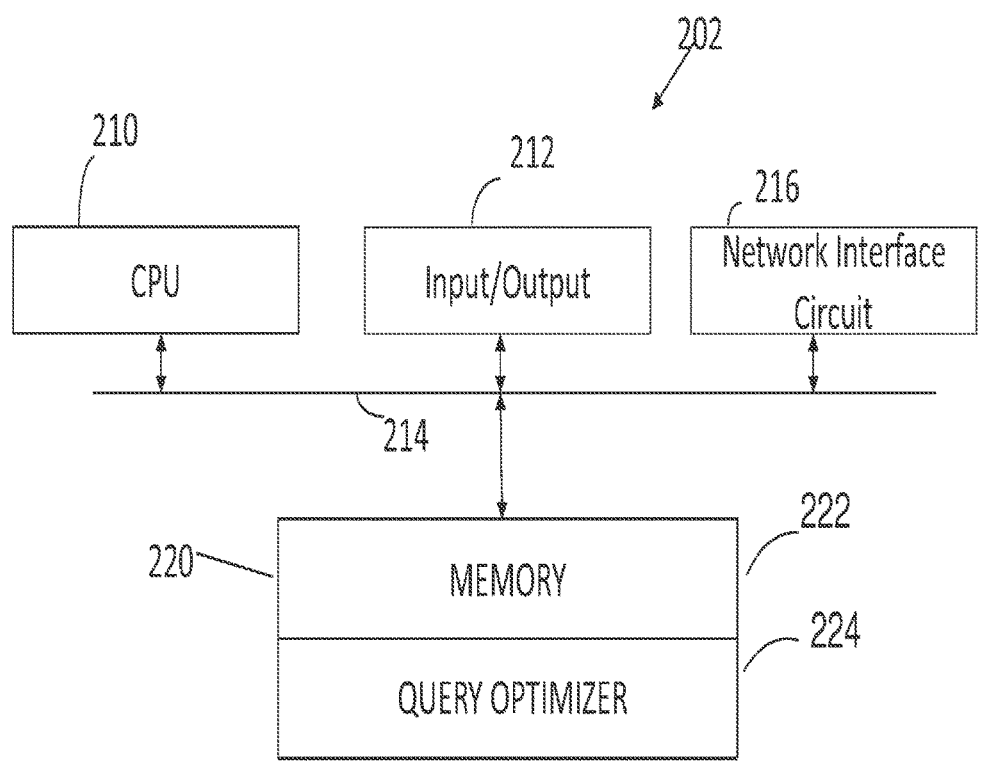
FIG. 2 illustrates a master node of the shared nothing database of FIG. 1 which may incorporate an embodiment of the invention.

FIG. 2 illustrates a master node 202 configured to implement operations in accordance with the invention. The master node may comprise a host computer system 210 (which may be a multi-processor system comprising a plurality of CPUs) connected to input/output (I/O) devices 212 by a bus 214. The I/O devices may be standard computer system input and output devices. A network interface circuit 216 may also be connected to bus 214 to allow the master node to operate in a networked environment. Clients 106 may communicate with the distributed database through the master node (see FIG. 1) using either the I/O devices or the network interface circuit. The master node may also have a memory 220 connected to the bus that embodies executable instructions to control the operation of the host computer system of the node and to perform processes in accordance with the invention. Included in memory 220 may be a main memory 222 and a query optimizer 224 comprising instructions that control the CPU to perform query optimization processes in accordance with the invention.

As will be described, the invention affords optimization of queries on databases employing RLE-based compression at the storage level. It provides a framework to exploit RLE compression during query optimization to optimize the queries to minimize computation costs and reduce overall response time. Optimization processes in accordance with embodiments of the invention identify logical query plans, or portions thereof, that bind to certain predetermined patterns and include certain predetermined query operators and/or aggregation operations involving RLE-compressed relations to which logical transformations may be applied that rearrange the query plan and/or use different query operators to produce an optimized logically equivalent plan. The logical query plans are then transformed into the optimized logically equivalent plans. The transformed plans enable optimized queries to operate directly on compressed data and produce correct results without first having to decompress the data. This minimizes computation costs and reduces overall response time by avoiding the necessity of performing multiple query computations on uncompressed data that is the same.

A logical query plan comprises a tree of query language operators that correspond to relational operations such as GET, COMPRESS, DECOMPRESS, JOIN, GROUPBY, and others. The output of each operator is a relation, and each operator produces a set of output columns. For instance, a GET operator corresponds to reading a relation from a storage device and presenting the data in tabular form. This operator has no children. The JOIN operator has two children which correspond to its inputs. It possesses a qualification expression that corresponds to the join condition between two relations. A GROUPBY operator has one child as an input and has a set of grouping columns that should be logically grouped to compute the output relation. The output of the GROUPBY operator may be associated with aggregate functions such as SUM, MIN and COUNT. A COMPRESS operator has one child, and transforms an uncompressed relation to a compressed one. A DECOMPRESS operator performs the reverse function by transforming a compressed relation into an uncompressed one. For example, a stream of numbers <5,5,6,6,6,6,1,1> may be RLE compressed to the form <(5,2),(6,4),(1,2)> where second number represents frequency of occurrence of the first element (number). The COMPRESS operation goes from a stream of objects to RLE-compressed form, whereas the DECOMPRESS operation goes in the opposite direction.

Figure 3:
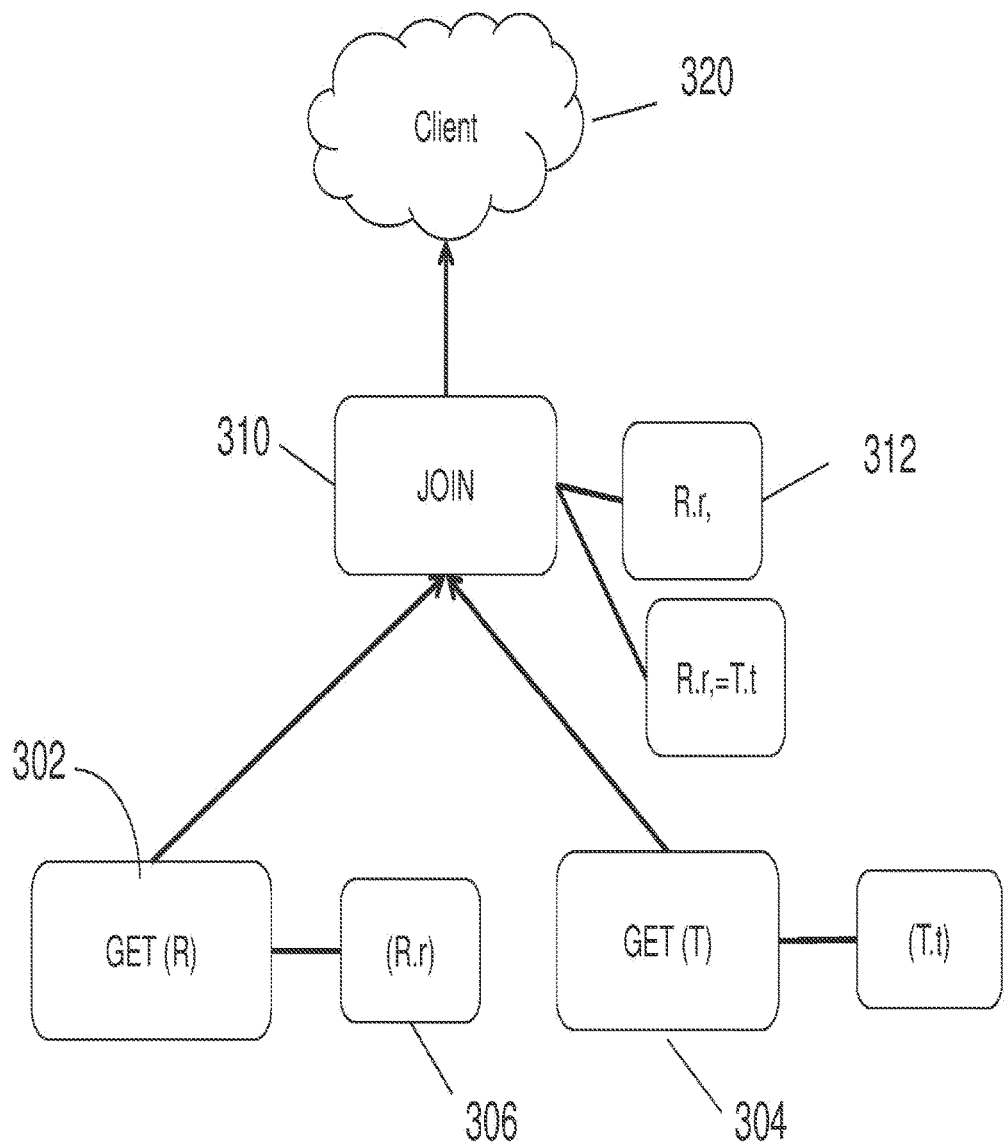
FIG. 3 is an example of a logical query plan for a database.

FIG. 3 is an example of a logical query plan for a query of the form: SELECT R.r FROM R INNER JOIN T ON (R.r=T.t). R is a relation, e.g., a table, with one column "R.r", where "r" is a column value. Similarly, T is a relation with a column "T.t", where "t" is a column value. The GET (R) operator 302 and the GET (T) operator 304 read values (R.r) 306 and (T.t) 308, respectively. The join operator 310 has a condition "R.r,=T.t" 312, that determines whether the values "r" and "t" are equal, and provides the answer to a client 320.

Figure 4:
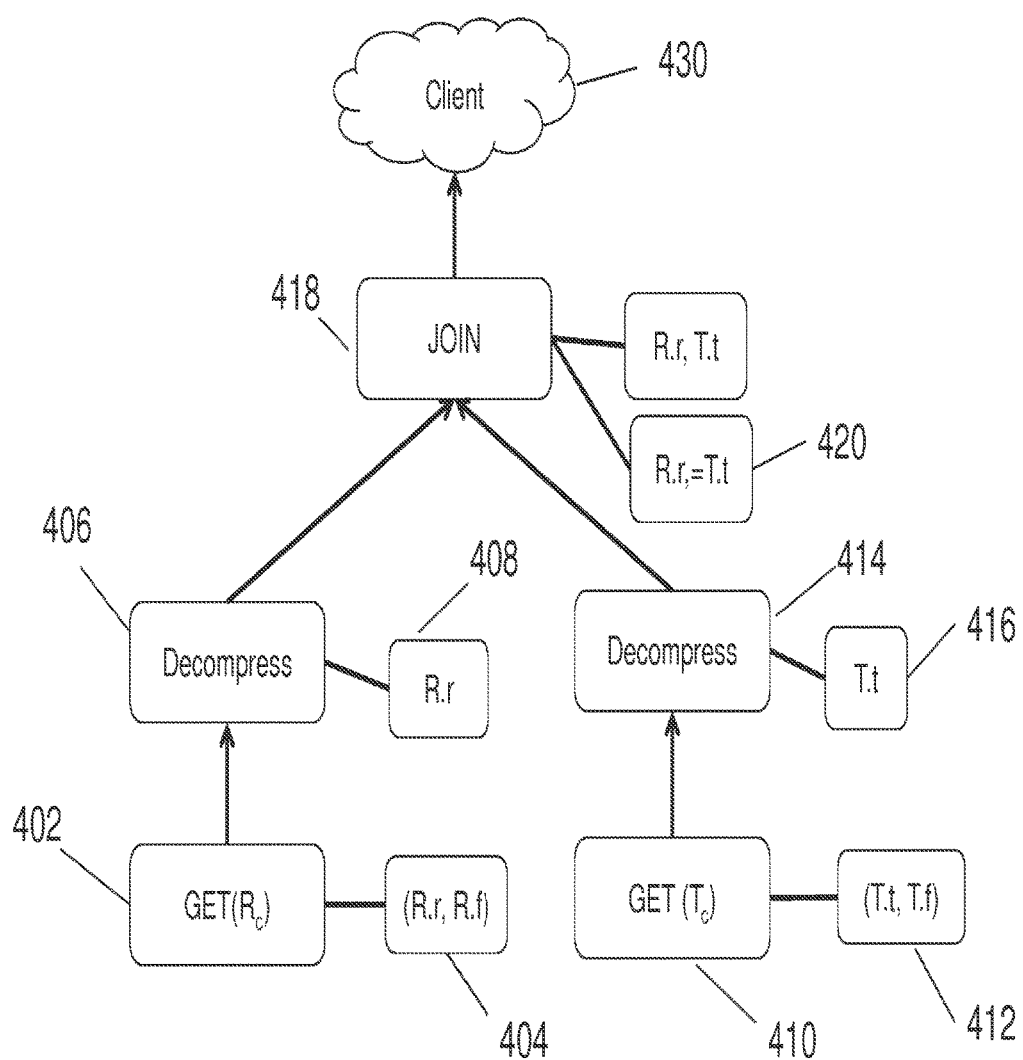
FIG. 4 illustrates the logical query plan of FIG. 3 for use on compressed relations.

FIG. 4 illustrates a query plan for the same query applied to a compressed database. The RLE-compressed form of relation R may be designated $R_C$ and has two columns ($R_C$.r, $R_C$.f), where the second column corresponds to the frequency of occurrence "f" of a particular "r" value. Similarly, the RLE-compressed form of relation T may be designated $T_C$ with columns ($T_C$.t, $T_C$.f) where the second column indicates the frequency of occurrence of the value "t". In FIG. 4, the operator GET($R_C$) 402 obtains the values (R.r, R.f) 404 and a DECOMPRESS operator 406 decompress the values to obtain the values "r" 408. Similarly, the operator GET($T_C$) 410 obtains the values (T.t, T.f) 412, and a DECOMPRESS operator 414 decompress the values to obtain the values "t" 416. A JOIN operator 418 having the condition "R.r,=T.t" 420 determines whether the value of "r" and the value of "t" provided by operators 406 and 414, respectively, are equal, and provides the answer to a client 430.

The logical query plan of FIG. 4 compares each decompressed value "r" of R with a given decompressed value "t" of T in the JOIN operation 418, and then repeats this process for the next decompressed value "t". Where the value "r" has a frequency of occurrence of "$f_r$" and the value "t" has a frequency of occurrence of "$f_t$", the query is run $f_r$ times using the same value "r" for each of the $f_t$ occurrences of the same value "t". Thus, the number of times that the query must be run on the same data is $f_r$ multiplied by $f_t$. If, for example, $f_r$ =4 and $f_t$ =3, the query must be executed on the same data values 4*3=12 times, which is costly, time-consuming and inefficient. As will be described, the invention identifies certain patterns in query plans that can be transformed to an optimized plan so that it operates directly on compressed data and provides the correct answer, thus avoiding multiple repeats of a query on data that is the same.

Figure 5A:
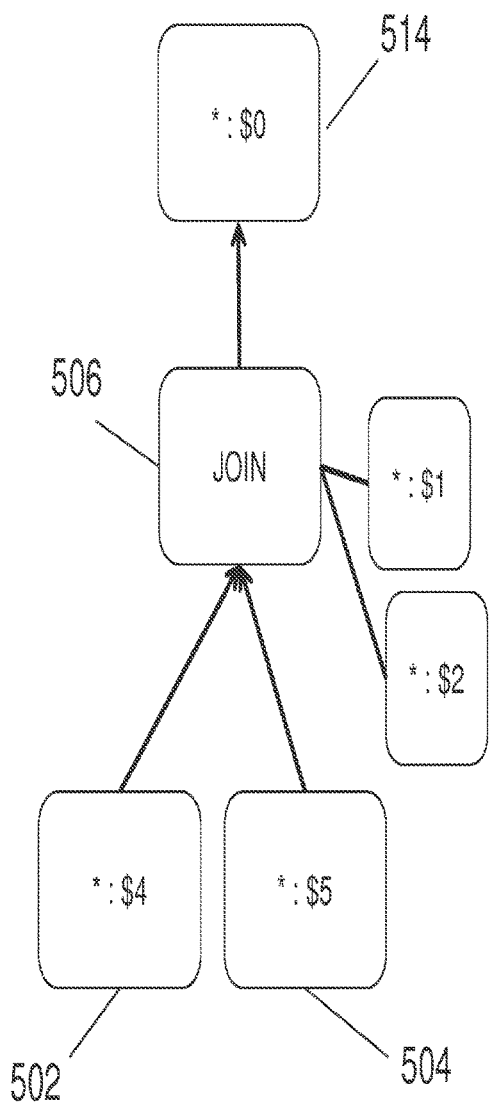
FIGS. 5A and 5B illustrate, respectively, an example of a query plan pattern and a transformation of the query plan into a logically equivalent query plan.
Figure 5B:
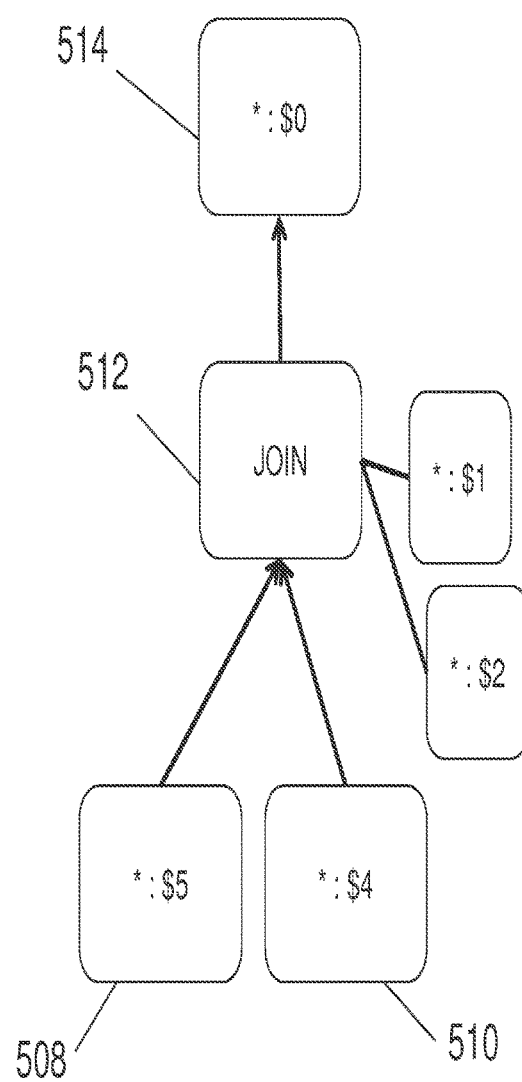

A transformation takes an input query plan and produces a logically equivalent query plan. Every transformation has a precondition that must be satisfied for the transformation to be applicable. The precondition is typically expressed as a pattern tree. If there's a binding (matching) of the input plan to the pattern tree, then the transformation is applicable. FIGS. 5A and 5B illustrate, respectively, a pattern tree and a simple transformation for JOIN commutativity. The transformation shown in FIG. 5B of an input query plan binding to the pattern tree of FIG. 5A merely exchanges the left and right children 502 and 504 of the JOIN operator 506 as shown at 508 and 510 for the JOIN operator 512. As shown in the figures, both the input plan and the transformation produce the same result 514, which is a requirement for an acceptable transformation.

The invention affords patterns and transformations that enable input query plans, or portions thereof, that bind to certain patterns and which operate on uncompressed data to be transformed so that their transformations operate directly on compressed data to produce the correct answers. While pattern binding and transformations are generally known, they have not previously been applied to compressed data. Known query optimization techniques that are applicable to queries for uncompressed data are very difficult to apply to optimize queries that can be used for compressed data and produce correct answers. The invention identifies those query plans that can be transformed to operate correctly on compressed data by matching the structures and semantics of queries to certain predetermined patterns. The invention then transforms the query plans (and queries) accordingly. Transformations in accordance with the invention take as an input a query plan such as illustrated in FIG. 4 which decompresses relations early in the query so that the query operates on uncompressed data, and transforms the input query plan to one that decompresses higher up (later), or avoids decompression altogether, so that the transformed query plan operates on compressed data. This enables database operations to work on smaller chunks of compressed data, resulting in better performance. This process is illustrated in FIGS. 6 and 7.

Figure 6:
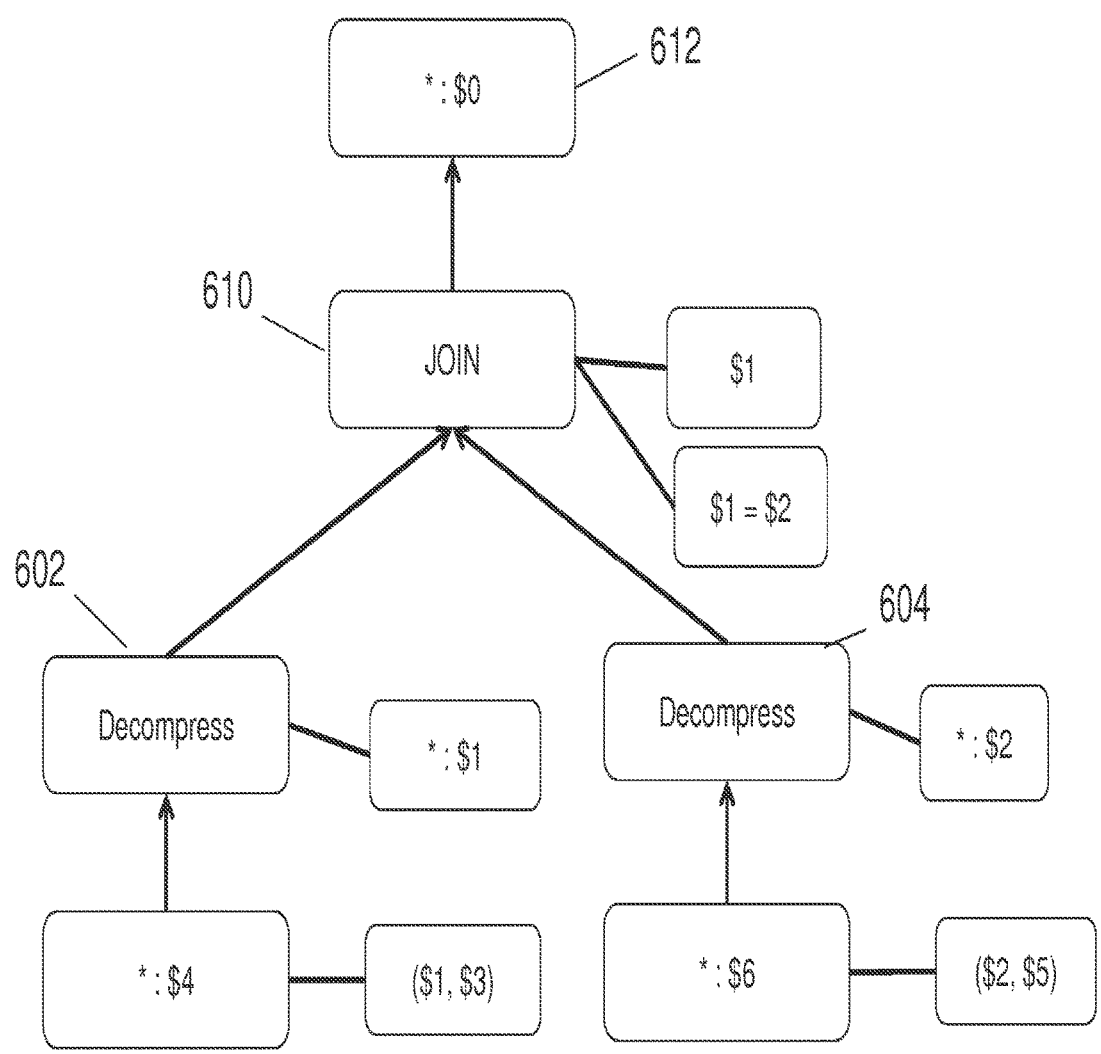
FIG. 6 illustrates a query plan pattern that decompresses compressed data and includes a JOIN operator which may be transformed and optimized in accordance with the invention.

FIG. 6 illustrates a pattern for an input plan that is similar to the logical query plan of FIG. 4. As shown, the pattern has DECOMPRESS operators 602 and 604 early in the query that decompress compressed data prior to a JOIN operator 610. This means that the JOIN operates on decompressed data and that the query must be run multiple times on data values that are the same, as previously explained.

Figure 7:
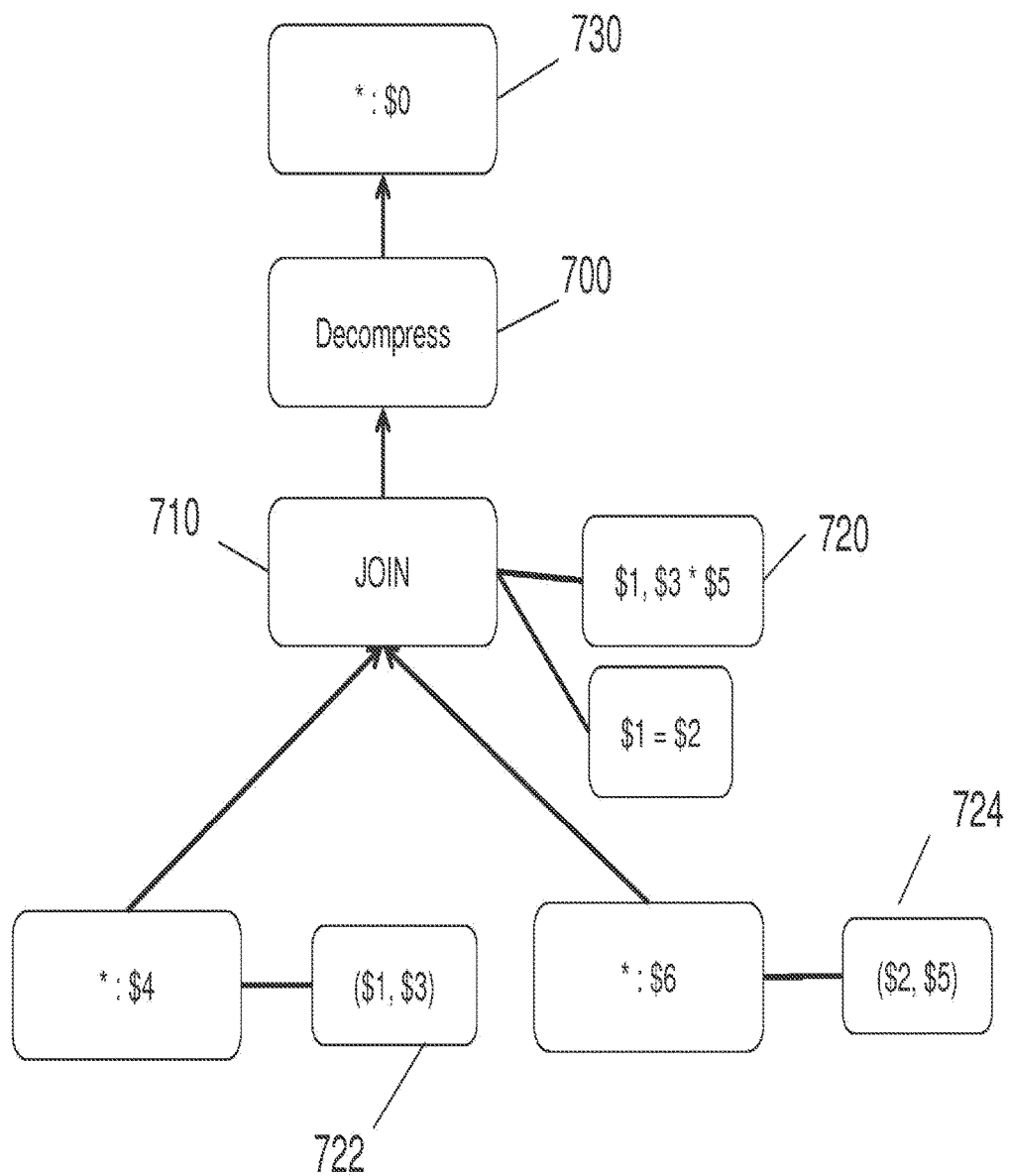
FIG. 7 illustrates a transformation and optimization of the query plan of FIG. 6 in accordance with an embodiment of the invention.

FIG. 7 illustrates a transformation of the query plan pattern of FIG. 6 in accordance with an embodiment of the invention, where the DECOMPRESS operator 700 has been moved above the JOIN operator 710 so that DECOMPRESS operates on the results of the JOIN operation. In addition, as indicated at 720, the second output column of the JOIN operator multiplies the frequencies ($3*$5) from its left and right children 722, 724, respectively. Notably, the transformed plan of FIG. 7 produces the same answer 730 as the answer 612 produced by the input query plan of FIG. 6, demonstrating that the transformation produces a logically equivalent query that minimizes processing and overall response time to obtain correct answers.

Figure 8:
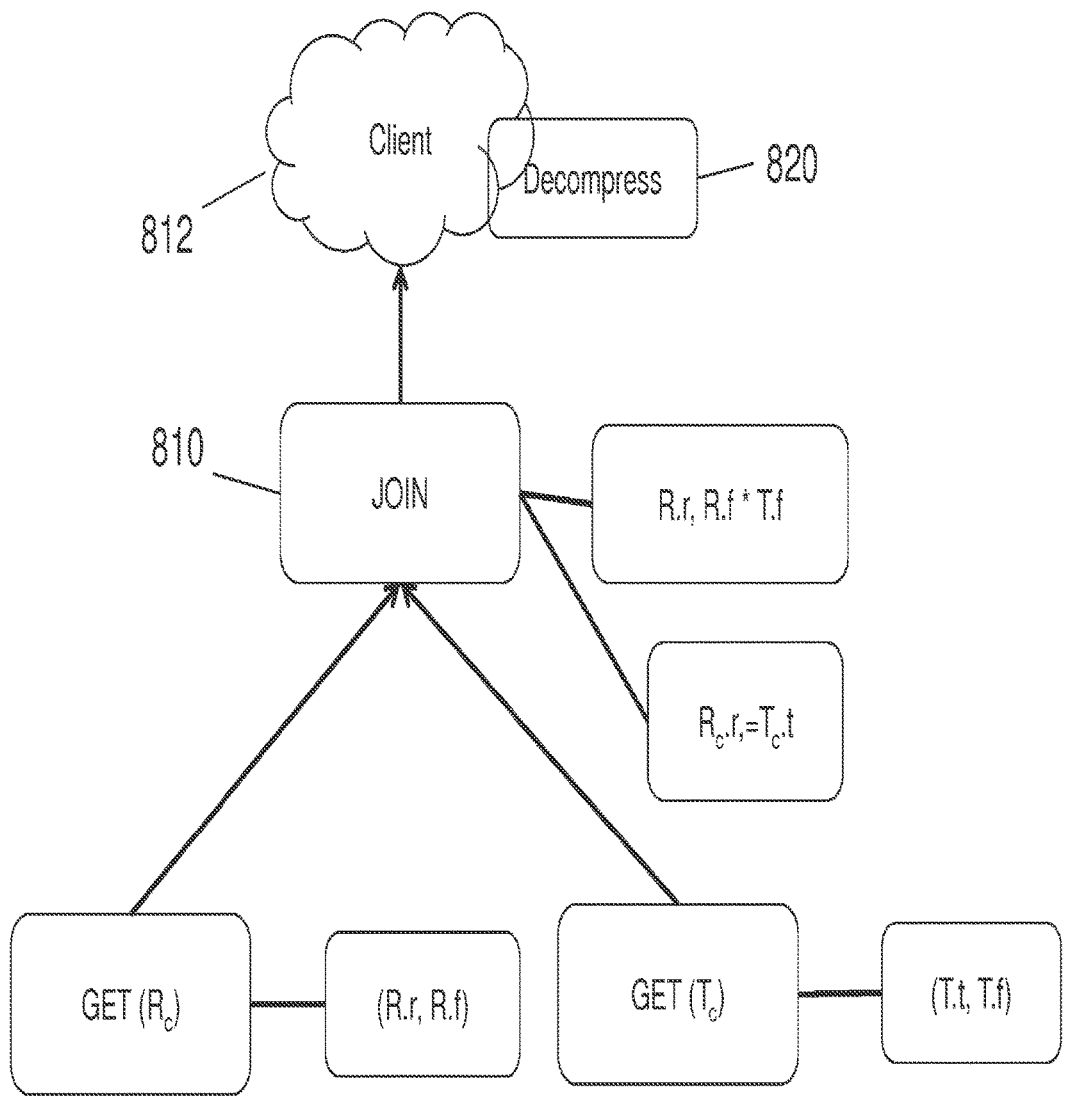
FIG. 8 illustrates the transformation of FIG. 7 applied to the query plan of FIG. 4 in accordance with another embodiment of the invention.

FIG. 8 illustrates another transformation of the logical query plan of FIG. 4 that is substantially similar to the transformation illustrated in FIG. 7, except that the transformation of FIG. 8 eliminates the DECOMPRESS operation altogether from the plan. As shown in FIG. 8, the output of the JOIN operation 810 is supplied directly to the client 812, and the DECOMPRESS operation 820 is moved from the query to the client. This advantageously further reduces the processing that the master node of the database must perform, which improves the database response time to queries. In a large distributed database, moving decompression to a client can result in a substantial improvement in query response time.

Figure 9A:
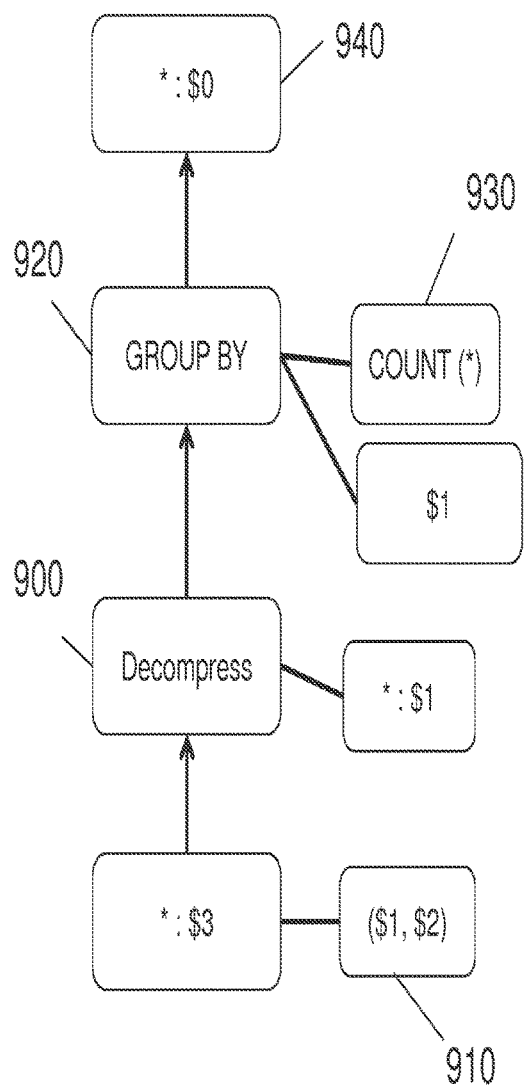
FIGS. 9A and 9B illustrate, respectively, another query plan pattern for use with compressed data and a corresponding transformation of the plan in accordance with an embodiment of the invention, where the transformed plan uses a different query operator to enable operation directly on compressed relations.
Figure 9B:
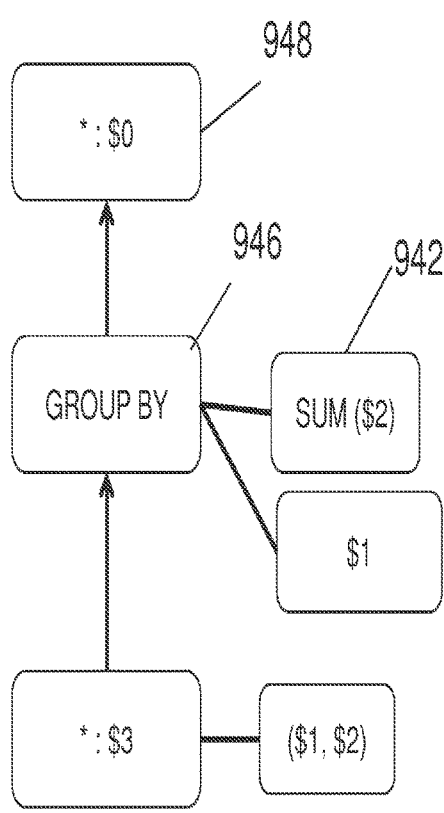

FIGS. 9A and 9B illustrate, respectively, another input query plan pattern for use with compressed data, and a corresponding transformation of the input plan in accordance with an embodiment of the invention where the transformed plan uses a different query operation to work directly on compressed relations. The pattern of FIG. 9A applies to an input query on compressed data R, of the form: SELECT COUNT(*) FROM $R_c$ GROUP BY $R_c.r$. The pattern has a DECOMPRESS operator 900 that decompresses compressed data 910 before it is operated on by a GROUPBY operator 920 which groups the results of a COUNT operation to provide an answer 940 to the query. The transformation of FIG. 9B changes both the form of the input query as well as its query operators. The query is transformed to: SELECT SUM($R_c.f$) FROM $R_c$ GROUP BY $R_c.r$. As shown, the COUNT operator 930 is replaced with a SUM operator 942. In the transformed plan, the GROUPBY operator 946 produces an answer 948 that is the same as the answer 940 produced by a query operating on decompressed data. This enables eliminating altogether the DECOMPRESS operator 900 from the transformed plan so that it operates on compressed data. This transformation is made possible by the invention because of the discovery that a COUNT operation on uncompressed data in the pattern of FIG. 9A is equivalent to a SUM operation on compressed data in the transformed plan of FIG. 9B.

The foregoing pattern binding and transformation process of the invention may be applied repeatedly to different portions of a more complex query plan to optimize those portions for compressed data and to produce a new overall query plan that is less costly computationally and that has an improved response time.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A computer-implemented method comprising:
   receiving, by a distributed database system from a client device, a query;
   generating, by the distributed database system, a first query plan for computing query results for the query from compressed data, wherein the first query plan includes one or more first decompress operators that are applied to data in compressed form to generate data in decompressed form, wherein the first query plan specifies that the one or more first decompress operators are executed before a particular operator that is a root operator of the first query plan;
   determining that the first query plan is logically equivalent to a second query plan that replaces the one or more first decompress operators with a second decompress operator that is a root operator of the second query plan;
   in response, generating a third query plan that eliminates the second decompress operator and that specifies execution of decompress operations on the client device; and
   obtaining compressed query results from the database using the third query plan; and
   providing the compressed query results to the client device in response to receiving the query.

2. The computer-implemented method of claim 1, further comprising:
   providing, to the client device, instructions to decompress the compressed query results from the database.

3. The computer-implemented method of claim 1, wherein the first query plan specifies that one or more first decompress operators are executed by the distributed database system.

4. The computer-implemented method of claim 3, wherein the third query plan specifies that the particular operator is executed by the distributed database system.

5. The computer-implemented method of claim 1, wherein determining that the first query plan is logically equivalent to the second query plan comprises:
   determining, based at least on the (i) structure of the first query plan and (ii) semantics of the first query plan, that the first query plan matches the second query plan.

6. The computer-implemented method of claim 1, wherein the particular operator is a JOIN operator.

7. The computer-implemented method of claim 1, wherein the third query plan has a same structure and semantics as a structure and semantics of the second query plan except that the third query plan does not include the decompress operator after the particular operator.

8. A system comprising:
   one or more computers and one or more storage devices storing instructions that are operable, when executed by the one or more computers, to cause the one or more computers to perform operations comprising:
   receiving, by a distributed database system from a client device, a query;
   generating, by the distributed database system, a first query plan for computing query results for the query from compressed data, wherein the first query plan includes one or more first decompress operators that are applied to data in compressed form to generate data in decompressed form, wherein the first query plan specifies that the one or more first decompress operators are executed before a particular operator that is a root operator of the first query plan;
   determining that the first query plan is logically equivalent to a second query plan that replaces the one or more first decompress operators with a second decompress operator that is a root operator of the second query plan;
   in response, generating a third query plan that eliminates the second decompress operator and that specifies execution of decompress operations on the client device; and
   obtaining compressed query results from the database using the third query plan; and
   providing the compressed query results to the client device in response to receiving the query.

9. The system of claim 8, wherein the operations further comprise:
   providing, to the client device, instructions to decompress the compressed query results from the database.

10. The system of claim 8, wherein the first query plan specifies that one or more first decompress operators are executed by the distributed database system.

11. The system of claim 10, wherein the third query plan specifies that the particular operator is executed by the distributed database system.

12. The system of claim 8, wherein determining that the first query plan is logically equivalent to the second query plan comprises:
  determining, based at least on the (i) structure of the first query plan and (ii) semantics of the first query plan, that the first query plan matches the second query plan.

13. The system of claim 8, wherein the particular operator is a JOIN operator.

14. The system of claim 8, wherein the third query plan has a same structure and semantics as a structure and semantics of the second query plan except that the third query plan does not include the decompress operator after the particular operator.

15. A computer program product, encoded on one or more non-transitory computer storage media, comprising instructions that when executed by one or more computers cause the one or more computers to perform operations comprising:
  receiving, by a distributed database system from a client device, a query;
  generating, by the distributed database system, a first query plan for computing query results for the query from compressed data, wherein the first query plan includes one or more first decompress operators that are applied to data in compressed form to generate data in decompressed form, wherein the first query plan specifies that the one or more first decompress operators are executed before a particular operator that is a root operator of the first query plan;
  determining that the first query plan is logically equivalent to a second query plan that replaces the one or more first decompress operators with a second decompress operator that is a root operator of the second query plan;
  in response, generating a third query plan that eliminates the second decompress operator and that specifies execution of decompress operations on the client device; and
  obtaining compressed query results from the database using the third query plan; and
  providing the compressed query results to the client device in response to receiving the query.

16. The computer program product of claim 15, wherein the operations further comprise:
  providing, to the client device, instructions to decompress the compressed query results from the database.

17. The computer program product of claim 15, wherein the first query plan specifies that one or more first decompress operators are executed by the distributed database system.

18. The computer program product of claim 17, wherein the third query plan specifies that the particular operator is executed by the distributed database system.

19. The computer program product of claim 15, wherein determining that the first query plan is logically equivalent to the second query plan comprises:
  determining, based at least on the (i) structure of the first query plan and (ii) semantics of the first query plan, that the first query plan matches the second query plan.

20. The computer program product of claim 15, wherein the particular operator is a JOIN operator.

* * * * *